US005825652A

United States Patent [19]

LeBlond et al.

[11] Patent Number: 5,825,652

[45] Date of Patent: Oct. 20, 1998

[54] SAMPLE GARMENT MAKING SYSTEM

[75] Inventors: Claude LeBlond, Broad Brook; Kevin M. Williams, Cromwell; Alex Zusmanovich, South Windsor; Allan Buckle, Cromwell; Darryl Colburn Stein, Andover, all of Conn.

[73] Assignee: Gerber Garment Technology, Inc., Tolland, Conn.

[21] Appl. No.: 525,123

[22] Filed: Sep. 8, 1995

[51] Int. Cl.$^{6}$ .............................. G06F 19/00; G06G 7/66

[52] U.S. Cl. ................................ 364/470.03; 364/474.13; 364/474.02; 83/422; 83/451; 81/463

[58] Field of Search ......................... 364/470.03, 474.13, 364/470.06, 474.02; 83/422, 152, 451, 937, 941; 81/463

[56] References Cited

U.S. PATENT DOCUMENTS

| | | | |
|---|---|---|---|
| 2,357,206 | 8/1944 | Klages | 33/32 |
| 2,612,951 | 10/1952 | Palmleaf | 164/95 |
| 3,064,514 | 11/1962 | Wilson | 83/571 |
| 3,245,295 | 4/1966 | Mueller | 83/56 |
| 3,463,042 | 8/1969 | Goldman | 83/627 |
| 3,495,492 | 2/1970 | Gerber et al. | 83/374 |
| 3,548,699 | 12/1970 | Gerber | 83/528 |
| 3,772,949 | 11/1973 | Pavone et al. | 83/56 |
| 3,895,358 | 7/1975 | Pearl | 340/172.5 |
| 4,186,632 | 2/1980 | Leslie et al. | 83/13 |
| 4,221,150 | 9/1980 | Bergfelt et al. | 83/882 |
| 4,392,404 | 7/1983 | Schwarzenberg et al. | 83/886 |
| 4,403,416 | 9/1983 | Adachi | 30/273 |
| 4,524,660 | 6/1985 | Yonezawa | 83/639 |
| 4,581,965 | 4/1986 | Gerber | 83/24 |
| 4,619,992 | 10/1986 | Nasu | 83/422 |
| 4,633,742 | 1/1987 | Gutowski et al. | 83/13 |
| 4,683,650 | 8/1987 | Veser | 29/736 |
| 4,716,803 | 1/1988 | Waltonen | 83/529 |
| 4,725,961 | 2/1988 | Pearl | 364/475 |
| 4,736,661 | 4/1988 | Shirai | 83/882 |
| 4,762,040 | 8/1988 | Alcontara Perez et al. | 83/56 |
| 4,993,296 | 2/1991 | Nasu | 83/422 |
| 5,018,418 | 5/1991 | Nasu | 83/177 |
| 5,062,357 | 11/1991 | Senior et al. | 100/53 |
| 5,141,212 | 8/1992 | Beeding | 269/21 |
| 5,203,061 | 4/1993 | Hamada | 29/33 |
| 5,205,196 | 4/1993 | Blaimschein | 83/272 |
| 5,224,406 | 7/1993 | Nasu | 83/422 |
| 5,261,305 | 11/1993 | Nasu | 83/427 |
| 5,289,749 | 3/1994 | Imai et al. | 83/67 |
| 5,341,305 | 8/1994 | Clarino et al. | 364/470 |

FOREIGN PATENT DOCUMENTS

| | | | |
|---|---|---|---|
| 0271116A1 | 6/1988 | European Pat. Off. | D06H 7/24 |
| 0412376B1 | 2/1991 | European Pat. Off. | D06C 3/06 |
| 4128088A1 | 3/1992 | Germany | B65H 5/008 |
| 62-62985 | 3/1987 | Japan | D06H 7/04 |
| 62-184128 | 8/1987 | Japan | D01G 1/04 |

OTHER PUBLICATIONS

"Angular Type Linear Spline G. Series" Specification.

*Primary Examiner*—James P. Trammell
*Assistant Examiner*—Hien Vo
*Attorney, Agent, or Firm*—McCormick, Paulding & Huber

[57] ABSTRACT

A system for automatically making sample garments comprises a controller having a central process for preparing a marker based on data representing individual pattern pieces of an overall garment design and data representing selected portions of the sheet material from which the garment is to be constructed. The system further comprises an apparatus for cutting and performing other work operations on the sheet material. The apparatus includes a table having a core defining a vacuum plenum and a sheet material support surface.

37 Claims, 7 Drawing Sheets

SAMPLE GARMENT MAKING SYSTEM

BACKGROUND OF THE INVENTION

The present invention relates generally to a system for making sample garments from a design sketch. More particularly, the invention provides a sample garment making system including a controller for creating a marker defining the arrangement of pattern pieces as they are to be cut from fabric or other sheet material, and an apparatus for cutting and performing other work operations on the sheet material under the direction of the controller and according to the marker instructions. The system presents a very low profile and is similar in general appearance to plotters and other equipment typically found in a design studio environment.

It is typical in the fashion design industry to produce a sample garment from a design sketch almost entirely by hand. To produce a sample garment, a complete garment pattern is created from a design sketch, and then pattern pieces representing the individual parts comprising the garment are cut from paper, cardboard or plastic. Once the pattern pieces are cut, they are arranged on the fabric or other sheet material from which the garment is to be made and are used as templates for cutting the corresponding garment parts from the sheet material. The garment parts are then sewn or otherwise assembled to form the sample garment.

This is both a time consuming and expensive procedure, since it takes even highly skilled workers a considerable amount of time to create an overall garment pattern from the design sketch, cut the pattern pieces for the individual garment parts comprising the garment, arrange the pieces properly on the sheet material and then accurately cut the individual garment parts from the material. The skill level required to arrange the cut pattern pieces is higher still where the garment is cut from plaid, stripped, checked or other patterned sheet material, since the pattern pieces must be accurately positioned on the material to insure that the pattern in the material properly matches after the garment parts cut from the material are assembled.

Once the sample garment is cut and assembled, it is critically reviewed by the designer to determine if the garment accurately reflects the underlying design. Usually, modifications to the overall shape of the sample garment or to particular garment parts are required before the designer is satisfied that the garment accurately embodies what was intended in the design sketch. In addition, the designer may want to see sample garments made from several different materials or from materials having different patterns. Accordingly, it is often the case that many different sample garments must be cut and assembled before a particular fashion design is finalized.

Computerized pattern development systems are known in the art which enable a designer to sketch a design using a digitized drafting table. The designer utilizes a stylus to sketch a garment pattern on paper placed over the digitizer, and the lines drawn on the paper are converted into pattern pieces representing the individual garment parts comprising the garment by a processor linked to the digitizer. The lines drawn on the paper are simultaneously displayed on a monitor or other visual display for review by the designer. The system is provided with an editing function which allows the designer to implement any desired modifications to the overall pattern and/or to individual pattern pieces. Once a final pattern is achieved, the individual pattern pieces are printed on an associated printer or plotted and cut on an associated plotting/cutting apparatus. Such a system is fully disclosed in U.S. Pat. No. 5,341,305.

While the above-described system expedites the procedure for creating an overall garment pattern embodying a particular design and the individual pattern pieces comprising the pattern, the system has only limited capabilities for creating a marker defining the arrangement of the individual pattern pieces on the sheet material from which a sample garment will be made. Moreover, such a system cannot be utilized at all for cutting the individual parts comprising the garment from the material. Accordingly, a need remains for a fully automated sample garment making system that would accomplish these tasks. A sample garment making system of this kind would not only substantially reduce the time presently required to create sample garments, but would also eliminate the expense associated with having highly skilled individuals properly arrange the pattern pieces on the sheet material and cut the individual garment parts from the material using the corresponding pattern pieces as templates.

Fully automated marker making and garment cutting systems are known in the art; however, such systems typically include large, complex sheet material handling and cutting apparatus designed for manufacturing applications. Such systems would not, therefore, be suitable for use in the design studio environment, since these studios are often small and crowded with several designers, their support staff and the equipment typically utilized by those skilled in this art.

It is, therefore, an object of the invention to provide an automated system for producing a sample garment from a design sketch, wherein the system not only creates a marker defining the arrangement of individual pattern pieces as they are to be cut from sheet material from which the sample garment will be made, but also cuts the garment parts according to the marker instructions.

It is a further object of the invention to provide an apparatus for performing multiple work operations, in addition to the cutting operation, on sheet material for use in such a system.

It is a still further object of the invention to provide such a system that is configured to easily fit within the design studio environment.

SUMMARY OF THE INVENTION

The present invention meets these and other objects by providing a sample garment making system which includes a controller having a central processor for creating a marker based on data representing individual pattern pieces which define corresponding parts of the sample garment, and data representing selected portions of the sheet material on which the pattern pieces are to be arranged and the corresponding garment parts are to be cut.

The system further includes an apparatus controlled by command signals received from the controller for cutting and performing other work operations on the sheet material. The apparatus includes a table comprising a porous, air-permeable core. The core defines a vacuum plenum having a lower surface and a sheet material support surface for supporting the sheet material during a work operation. A digitizer is disposed adjacent to the opposite surface of the plenum. The digitizer is in electromagnetic communication with the support surface through the plenum and also communicates with the controller to provide the controller with data defining selected portions of the sheet material supported on the support surface.

The apparatus further includes a beam mounted on the table and extending across the support surface, the beam and the support surface being moveable relative to one another in a first coordinate direction. A carriage carrying a toolhead axially surrounds an associated portion of the beam and is mounted for movement along the beam in a second coordinate direction. Each end of the beam is supported on the table by a rigid, structural box, and these supports reduce deflections of the beam caused by movement of the carriage along the beam. In the case where the support surface of the table is stationary and the beam moves relative to the stationary surface in the first coordinate direction, the supports also reduce deflections of the beam caused by its movement back and forth along the table in this direction.

The toolhead carried by the carriage supports at least one tool assembly including a tool for performing a work operation on the sheet material. The tool assembly includes a piston-cylinder assembly for moving the tool into and out of working engagement with the support surface, and further includes means for rotatably mounting the tool on the piston. Drive means are provided for slidably receiving the means for mounting and for rotating this means and the tool attached thereto relative to the support surface.

DETAILED DESCRIPTION OF THE INVENTION

Figure 1:
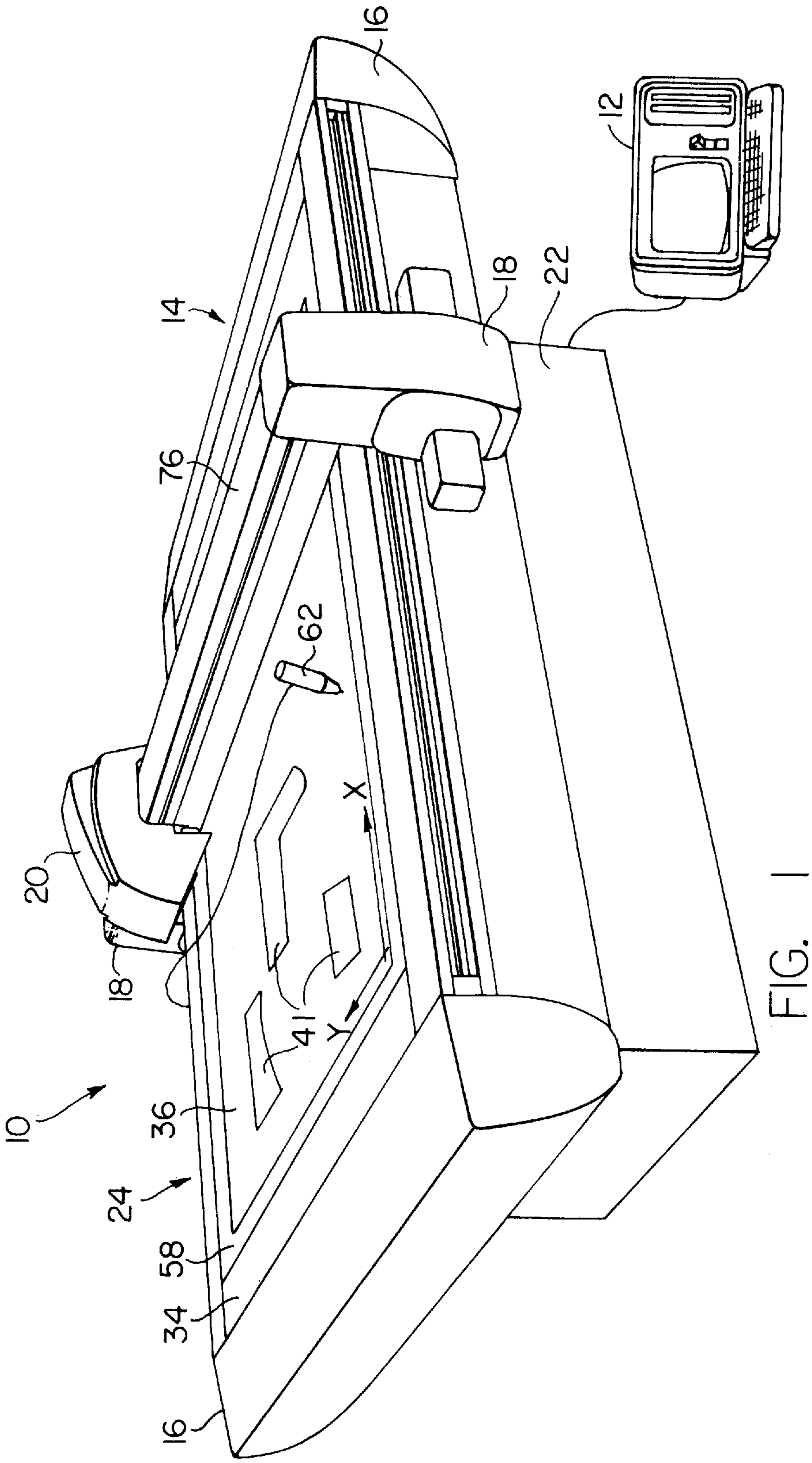
FIG. 1 is a perspective view of a sample garment making system embodying the invention.
Figure 2:
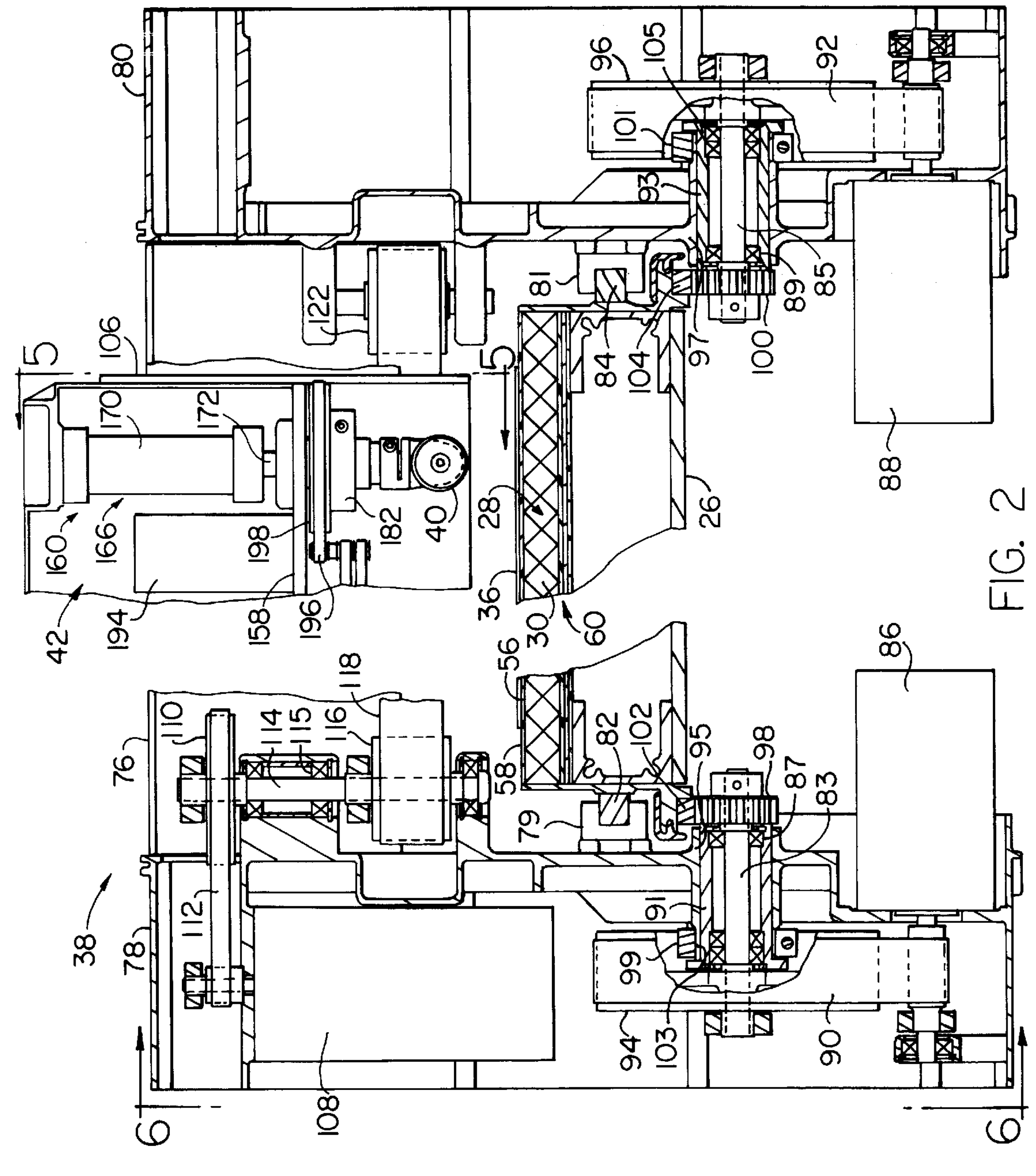
FIG. 2 is a front fragmentary sectional view of the table, support assembly and toolhead which form a part of the system shown in FIG. 1.

FIGS. 1 and 2 illustrate a sample garment making system embodying the invention. The system, generally designated 10, includes a controller 12 and an apparatus 14 driven by command signals from the controller for cutting and performing related work operations on sheet material supported on the apparatus.

As shown in FIG. 1, the system 10 presents a very low profile and is similar in general appearance to plotters typically found in the design studio environment. This is accomplished by the particular design of several of the apparatus' major mechanical components, as will be discussed further below, and by the use of coverings to shield the mechanical components of the apparatus from view. Several of these coverings, such as table end covers 16, 16, beam end covers 18, 18, tool carriage cover 20, and base enclosure 22 are shown in place in FIG. 1. For the purposes of clarity, these coverings have been removed in subsequent figures.

The controller 12 includes a central processor linked to a pattern development system (not shown) for receiving digitized representations of the individual pattern pieces comprising the sample garment. Any known pattern development system may be employed to create the digitized representations of the pattern pieces; however, in the preferred embodiment of the invention a pattern development system sold by Gerber Garment Technology, Inc. under the trademark SILHOUETTE™ is used.

Based on the digitized representations of the pattern pieces provided by the design development system, the central processing unit of the controller 12 creates a marker defining the arrangement of the individual pattern pieces on the sheet material as the corresponding garment parts are to be cut from the material. Typically, the sample garment is made from fabric; however, it should be understood that the invention is in no way limited in this regard and that the system 10 can be utilized with other sheet materials commonly used in garment making such as, for example, leather and suede.

Once the marker has been created, the controller forwards command signals to the apparatus 14 based on the marker instructions to cut the garment parts comprising the sample garment from the material. Thus, the system 10 permits complete automation of the sample garment making process up to the final step wherein the cut parts comprising the sample garment are sewn together or otherwise assembled.

In the illustrated embodiment of the system 10, the apparatus 14 comprises a vacuum hold-down table 24 which includes a frame 26 and a stationary, porous, air-permeable core 28. The core 28 defines a vacuum plenum 30 having a lower surface 32, and a generally horizontally disposed sheet material support surface 34 for supporting a layer of sheet material, such as the illustrated layer of fabric 36, in a spread condition.

A support assembly, generally designated 38, is provided for supporting a cutting wheel 40 for movement relative to the support surface 34 in the illustrated X and Y coordinate directions along predetermined cutting paths to cut the illustrated garment parts 41, 41. The cutting wheel 40 is mounted on a toolhead 42 which moves the cutting wheel into and out of cutting engagement with the fabric 36. As will be explained below, the toolhead also supports, in addition to the cutting wheel, other tools which enable the apparatus 14 to perform multiple work operations on the fabric 36.

Figure 3:
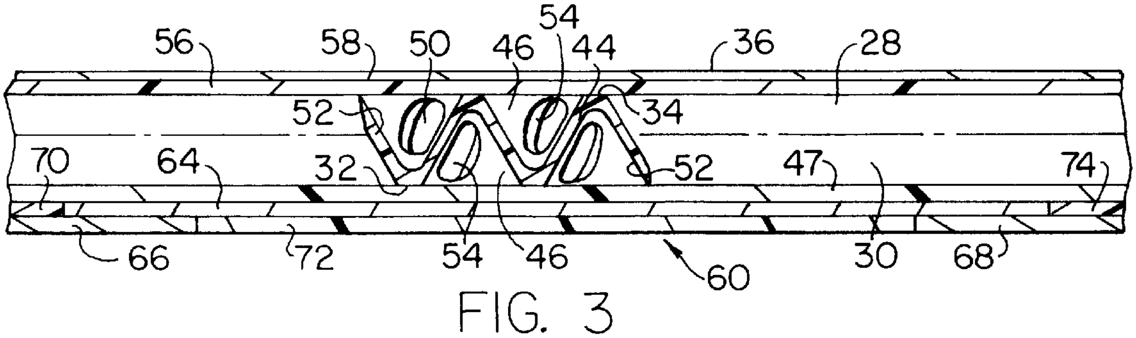
FIG. 3 is a fragmentary sectional view of the table which forms a part of the system shown in FIG. 1.
Figure 4:
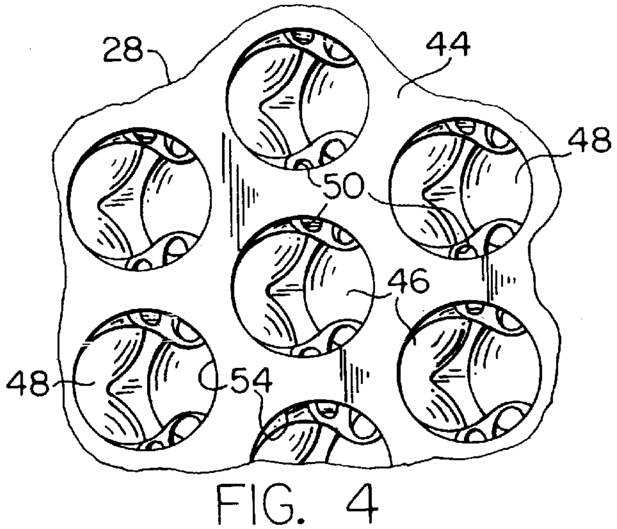
FIG. 4 is a top view of the core which forms a part of the table shown in FIGS. 1 and 2.

Referring now to the vacuum hold down table 24 in more detail, and in particular to FIGS. 1, 3 and 4, the core 28 is formed from a rigid plastic material 44 defining a plurality of appetures 46, 46 in both the lower surface 32 and the support surface 34 of the core. The material 44 further defines a plurality of interconnected vertical 48 and horizontal 50 air passageways which communicate with the appetures 46, 46. Accordingly, the core functions as a single structural element which defines not only the support surface 34, but also the vacuum plenum 30 for applying vacuum to the surface through the interconnected passageways.

Vacuum is applied by a vacuum source (not shown) housed within the base enclosure 22. The vacuum source communicates with the plenum 30 via an associated conduit and manifold (also not shown), and, since the plenum defined by the rigid plastic core has interconnected vertical and horizontal air passageways, vacuum may be applied to the entire support surface 34 by coupling the manifold to either the lower surface 32 or a side portion of the core 28. In the preferred embodiment of the invention, vacuum is applied along a side portion of the core. Accordingly, the table 24 includes a thin layer or skin 47 of plastic disposed immediately adjacent to the lower surface 32 and glued or otherwise attached to the core 28 to seal the appetures 46, 46 in this surface, thus maximizing the vacuum applied to the support surface 34.

In the illustrated embodiment of the invention, the core 28 measures about 120 inches in length and about 70 inches in width, although the usable portion of the support surface 34 has somewhat reduced length and width dimensions. The core measures about 0.75 inches in thickness and the plastic skin 47 measures about 0.06 inches in thickness. Of course, the length and width dimensions of the core 28 may be made larger or smaller depending on the particular application for which the system 10 and its associated table 24 are intended.

The plastic material 44 forming the core 28 is preferably an over-expanded ABS copolymer manufactured and sold under the trademark NoreCore® by the Norfield Corporation of Danbury, Conn. The core is made by partially melting a sheet of the copolymer between two heated, appetured plates. Vacuum is applied to the plastic sheet through the appetures in the plates, and the plates are pulled apart to draw and stretch the partially melted plastic to form webs 52, 52 extending between the lower surface 32 and the support surface 34. The plates continue to be pulled apart until the webs rupture to form holes 54, 54, thus providing the interconnected vertical and horizontal passageways 48 and 50. After the plastic sheet cools it is removed from between the plates with the appetures 46, 46 already formed in the lower and support surfaces by the vacuum applied through the appetures in the heating plates. Depending on the degree to which the webs 52, 52 have ruptured, additional holes 54, 54 may have to be punched or drilled in the webs in order to provide the core with adequate air permeability.

It should be understood that the invention is not limited to a core formed from this material and in the manner just described. Instead, the core may be formed by any suitable material which simultaneously defines the support surface 34 and the vacuum plenum 30. Thus, for example, other thermoplastic materials, open cell foams, or even ceramic could be utilized to form the core 28.

To provide a well dispersed, evenly distributed vacuum across the entire extent of the support surface 34, as well as a uniform work surface as the cutting wheel 40 or other tool is directed along a work path by command signals from the controller 12, a layer 56 of fluid permeable material is supported on the table 24. The upper surface of this layer defines a uniform work surface 58 against which the fabric 36 is firmly held as vacuum is applied through the layer 56 during a work operation. In the preferred embodiment of the invention, the layer 56 comprises a 0.06 inches thick sheet layer of air permeable paper available under the trademark TEXTRON™ from Texon-USM Corp., Russel Mass. Of course, other known fluid permeable materials could be used to form the layer 56 such as, for example, porous cardboard, a rigid porous foam, or a high density filter media having pore sizes in the range of about 80 microns.

Since the core 28 combines both the support surface 34 and the vacuum plenum 30 in a single structural element, the overall distance from the work surface 58 to the bottom of the plastic skin 47 measures less than an inch. This feature of the invention permits the placement of a digitizer 60 directly below the plastic skin 47, and in the case where such skin is not utilized, the digitizer 60 may be placed immediately adjacent the lower surface 32.

The digitizer 60 is electromagnetically coupled, directly through the core 28, to a stylus 62 (see FIG. 1) used for marking on the fabric 36 as it is supported in a spread condition on the support surface 34. The digitizer itself is linked to the controller 12. Thus, digitized representations of any markings made on the fabric 36 using the stylus 62 are received by the controller and may be utilized in preparation of the marker.

For example, if the fabric 36 has a flawed area that the designer wishes to avoid when the pattern pieces are arranged and the corresponding garment parts cut, this area may be marked out using the stylus 62. Digitized data representing this marked out area is received by the controller 12, and the central processor of the controller adjusts the marker instructions to rearrange the pattern pieces so as to avoid this area during cutting of the individual garment parts. It may also be the case that a particular garment part is intended to include a specified design or appliqué. Where the design is already incorporated in a particular portion of the fabric 36 or the appliqué has been pre-applied at a specific location on the fabric, the corresponding area of the fabric is marked using the stylus and the marker adjusted to insure that when the particular garment part is cut, it includes this area of the fabric with the design or appliqué properly positioned within the part.

Any number of other possibilities for use of the digitizer 60 and its associated stylus 62 will be immediately obvious to the those skilled in the art. The important point to be recognized is that the controller 12 can create the marker based not only on data representing the pattern pieces which correspond to the individual garment parts comprising the sample garment, but also data representing selected portions of the fabric or other sheet material from which the parts will be cut.

As shown best in FIG. 3, the digitizer 60 is not provided as a single digitizing tablet but, instead, comprises a series of overlapping digitizer panels. In the illustrated embodiment of the invention, three such panels are provided 64, 66 and 68. Each of the panels measures about 42.7 inches in width, 70 inches in length and about 0.066 inches in thickness. Adjacent panels form overlap areas measuring about 4 inches in width, and the spacing between non-adjacent panels is taken up by plastic spacing elements 70, 72 and 74.

The number, arrangement and dimensions of the panels may, of course, vary depending on the dimensions of the table 24, and it is also possible, although not preferred, to provide the digitizer 60 as a single tablet. The manner in which the digitizer 60 is constructed and the manner in which the stylus 62 is coupled to the digitizer is fully disclosed in commonly assigned, co-pending patent application Ser. No.08/525,920, filled on Sep. 8, 1995, the disclosure of which is herein incorporated by reference.

While in the illustrated embodiment of the invention the vacuum table 24 includes the digitizer 60 disposed adjacent to the lower surface 32 of the core, the invention is not limited in this regard. The invention also encompasses vacuum tables which include a digitizer or other coordinate generating technology positioned above the work surface 58, such as, for example, tables utilizing ultrasonic or optical digitizers. The invention further encompasses tables which do not include a digitizing device. In either case, the core 28 may be formed from a material which is partially or completely opaque to electromagnetic fields such as, for example, porous metal composites.

Turning now to description of the support assembly 38, and referring in particular to FIGS. 1, 2, 5 and 6, the assembly comprises a beam 76 extending across the table 24 and supported at either end by a rigid structural box 78, 80. Each rigid box 78, 80 is slideably mounted by a bracket 79, 81 on an associated rail 82, 84 extending along opposite sides of the table frame. The boxes 78, 80 each house a respective drive motor 86, 88 drivingly connected by a belt 90, 92 and an idler pulley 94, 96 to a pinion gear 98, 100. The pinion gears mesh with respective racks 102, 104 mounted on and extending along opposites sides of the table frame 26. The drive motors are activated by command signals received from the controller 12 to translate the beam back and forth along the table in the illustrated X-coordinate direction.

Figure 6:
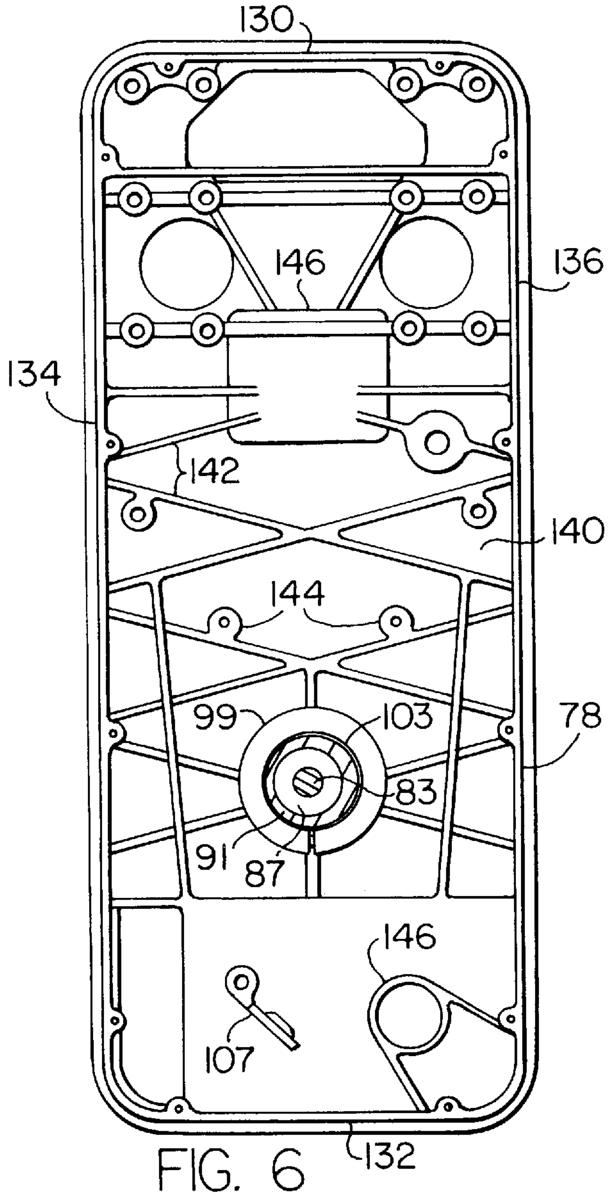
FIG. 6 is a end view taken along the lines 6—6 of FIG. 2.

To eliminated backlash between the pinion gears 98, 100 and the respective racks 102, 104, the support assembly 38 further includes means for adjusting the position of the gears with respect to the racks. As shown in FIGS. 2 and 6, each of the pinion gears 98, 100 is connected by a respective shaft 83, 85 to the idler pulleys 94, 96. Each shaft 83, 85 is journaled by bearings 87, 89 into a respective eccentric bushing 91, 93 mounted within support surfaces 95, 97 defined by the rigid boxes. Thus, by rotating the eccentric bushings 91, 93 within the support surfaces 95, 97, the axis of rotation of the shafts 83, 85, and hence the pinion gears 98, 100 connected to the shafts can be adjustably positioned with respect to the racks 102, 104. Once the bushings 91, 93 have been rotated to properly position the pinion gears, the bushings are respectively locked in place on the support surfaces 95, 97. This is accomplished by tightening collars 99, 101 to compress corresponding portions 103, 105 of support surfaces 95, 97 having a reduced thickness. After the bushings have been locked in place with the collars tension in the belts 90 and 92 is adjusted with tensioners supported on the boxes 78, 80. Only one such tensioner 107 is shown supported on box 78 in FIG. 6.

The support assembly further includes a carriage 106, slideably mounted on the beam 76 for movement back and forth in the illustrated Y-coordinate direction. The carriage 106 supports the toolhead 42 and is translated along the beam by a drive motor 108 housed within the rigid box 78. The motor 108 is drivingly connected by a pulley 110 and a belt 112 to one end of a spindle 114 journaled in a bearing 115. The opposite end of the spindle 114 includes a sprocket 116 which meshes with a toothed belt 118. The belt 118 extends along the entire length of the beam 76 through a hollow or generally C-shaped portion 120 of the beam (see FIG. 5), and then loops around an idler pulley 122 supported in the box 80 at the opposite end of the beam. The carriage 106 is provided with a ribbed mounting clamp 124 for attaching the carriage to the belt. The ribs on the clamp mesh with the teeth on the belt 118 providing for more positive engagement between the belt and the clamp and more accurate translation of the carriage 106 along the beam 76. To ensure smooth sliding engagement between the carriage 106 and the beam 76, the carriage includes a plurality of pillow blocks 126, 126 (two shown in FIG. 5) which slideably engage corresponding bearing surfaces 128, 128 on the beam.

Thus, the carriage 106 can be moved back and forth along the beam in the Y-coordinate direction according to command signals received by the drive motor 108 from the controller 12. Further, since the toolhead 42 is mounted on the carriage 106 and the carriage is itself mounted on the beam 76, the drive motors 86, 88 and 108, under the control of appropriate command signals from the controller 12, can cause the cutting wheel 40 to follow any desired work path and cut the individual garment parts 41, 41 according to the marker instructions.

The design of several of the above-described components of the support assembly is important to the low profile appearance of the apparatus 14 and to the operation of the system 10. First, those skilled in the art will note that the support assembly does not utilize a single drive motor and torque tube arrangement for driving opposite ends of the beam 76. Instead, as described above, each end of the beam is driven directly by drive motors 86 and 88. This arrangement reduces the size and bulk of the apparatus 14 by eliminating the torque tube, and a single large drive motor together with its associated drive means for rotating the torque tube, and replacing these components with two much smaller and lighter motors. As shown in FIG. 2, parts of the drive motors 86 and 88, along with their drive components, are mounted, and therefore substantially concealed, within the rigid boxes 78 and 80. Further, since the torque tube is typically mounted in or on the beam, eliminating the tube and directly driving both ends of the beam permits the use of a smaller, lighter weight beam than would otherwise be required.

It will also be apparent to those skilled in the art that directly driving both ends of the beam provides for more accurate translation of the beam in the X-coordinate direction, since at least some lag in the non-driven end of the beam is inherent in designs utilizing a torque tube. In addition, since in the present case the beam does not carry the additional weight of the torque tube and can itself be made lighter, movement of the beam by the drive motors 86 and 88 is more responsive to the command signals received from the controller 12.

Supporting the ends of the beam on the table with the structural boxes 78, 80, instead of with a more typical solid support plate, also provides important advantages. First, as shown best in the illustration of box 78 in FIG. 6, each box is a generally rectangularly-shaped structure of thin-wall construction, including top wall 130, bottom wall 132, side walls 134, 136 and rear wall 140. This integral structure, which in the preferred embodiment of the invention is cast as a single piece, is both highly rigid and light weight. To increase the rigidity of the structure and at the same time reduce the thickness of the walls, the box is reinforced by a plurality of integrally formed ribs 142, 142. Also integrally formed with the rigid box 78 are a plurality of bosses 144, 144 for attaching the box to the beam 76 and the bracket 79, as well as a plurality of mounting surfaces 146, 146 for mounting several of the drive components of the support assembly.

Thus, the rigid structural boxes provide a more rigid and light weight structure for supporting the ends of the beam, as compared with the support plates typically used in the past. Moreover, the boxes provide a convenient means for substantially concealing drive components such as the drive shafts, shaft bearings and drive pulleys of the drive motors 86, 88, belts 90, 92 pulleys 94, 96 and the entire drive motor 108.

Figure 5:
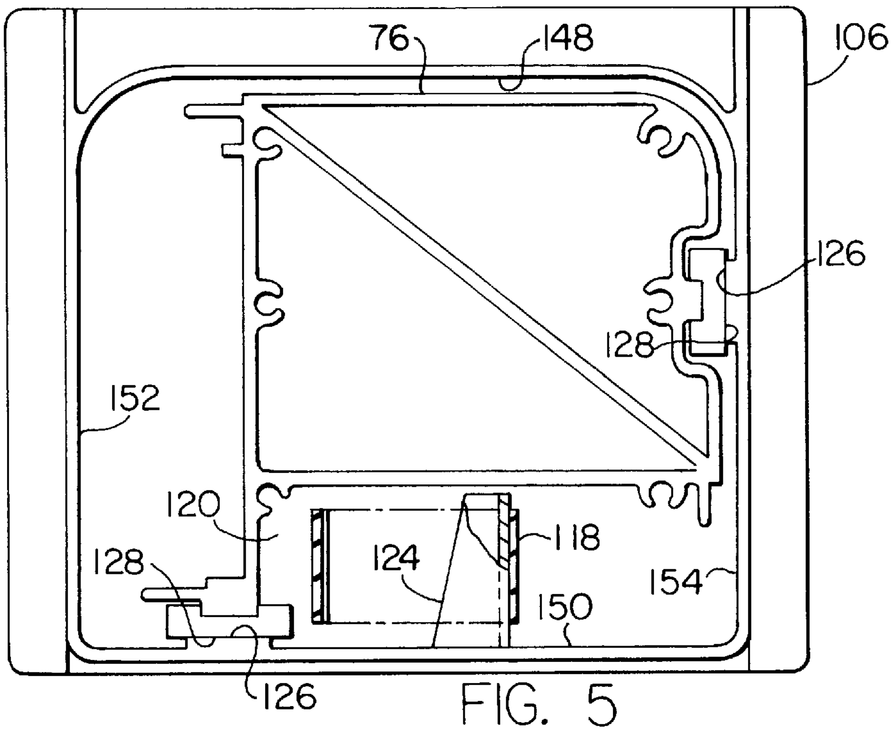
FIG. 5 is a sectional view taken along the line 5—5 of FIG. 2 with the toolhead shown in FIG. 2 removed.
Figure 7:
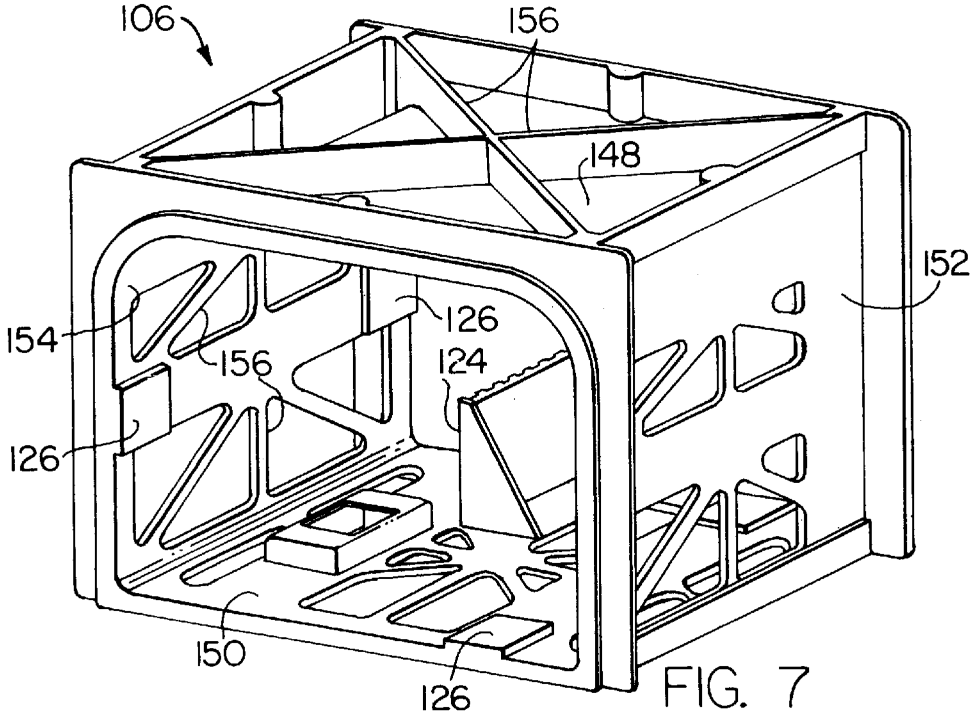
FIG. 7 is a perspective view of the toolhead support carriage which forms a part of the system shown in FIG. 1.

Referring now to FIGS. 5 and 7, it can be seen that the carriage 106 is a box-shaped structure having thin, partially open walls which completely surround the beam 76. Like the rigid boxes 78 and 80, the carriage is cast or otherwise integrally formed as a single, light-weight, highly rigid piece, having a top wall 148, bottom wall 150 and side walls 152, 154 reinforced with a number of integral ribs 156, 156. This design departs significantly from prior art toolhead support carriages, which typically take the form of a heavy support plate or bracket mounted on one side of the beam for movement in the Y-coordinate direction.

Providing the carriage 106 as a highly rigid, light weight box surrounding the beam is particularly important to the accurate translation of the carriage 106 and the beam 76 by the drive motors. As is typical in the art, a servo loop is established between the controller 12 and the drive motors 86, 88 and 108. The servo loop enables the controller to continuously determine the position of the beam and the carriage during a work operation, and to transmit the appropriate command signals for accurately moving the beam and the carriage in the X and Y coordinate directions according to the marker instructions.

The loop operates at a specified frequency, usually about 30 Hz. However, where the beam is supported at its ends by plates and where the Y carriage is formed as a heavy plate supported on one side of the beam, deflections in the beam caused by movement of the carriage along the beam and by acceleration of the beam from one position to another with the weight of the carriage suspended between the beam ends, can disrupt the operation of the servo loop. This occurs because the deflecting beam tends to resonate at a frequency which is very close to the operating frequency of the servo loop. Thus, the controller is unable to accurately determine the position of the beam and carriage or to maintain precise movement of the beam and carriage according to the marker instructions.

The design of the carriage 106 and the rigid boxes 78 and 80 substantially reduces this problem. Since the carriage 106 is light weight, highly rigid and completely surrounds the beam 76, it does not transmit significant forces to the beam as it moves back and forth along the beam in the Y-coordinate direction. Thus, deflections in the beam caused by the moving carriage are substantially reduced. Moreover, by supporting the ends of the beams with the rigid structural boxes 78, 80, instead of with a more typical solid plate support, deflections in the beam caused by its acceleration from one position to the next in the X-coordinate direction are also substantially reduced. Thus, the beam tends to resonate at a much higher frequency than that at which the servo loop operates and therefore does not interfere with the proper operation of the loop. For example, in the illustrated embodiment of the invention, the beam 76 resonates at a frequency two to three times higher than the operating frequency of the servo loop.

Accordingly, not only does the design of the support assembly provide the apparatus 14 with a low profile appearance generally similar to that of a plotter, the design also provides for highly accurate and precise operation of the system 10.

Figure 8A:
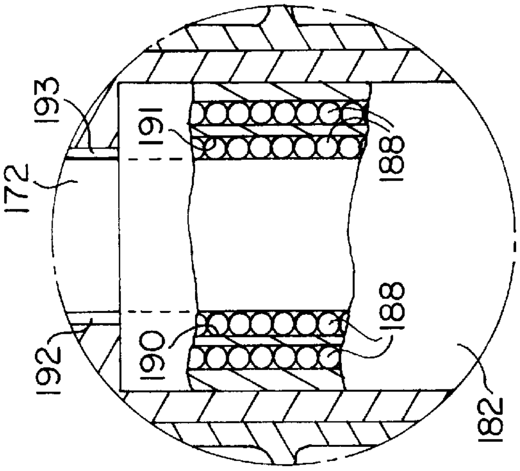
FIG. 8*a* is an enlarged fragmentary sectional view of the spline shaft and circulating linear ball bearing that forms a part of the toolhead shown in FIG. 2.
Figure 8:
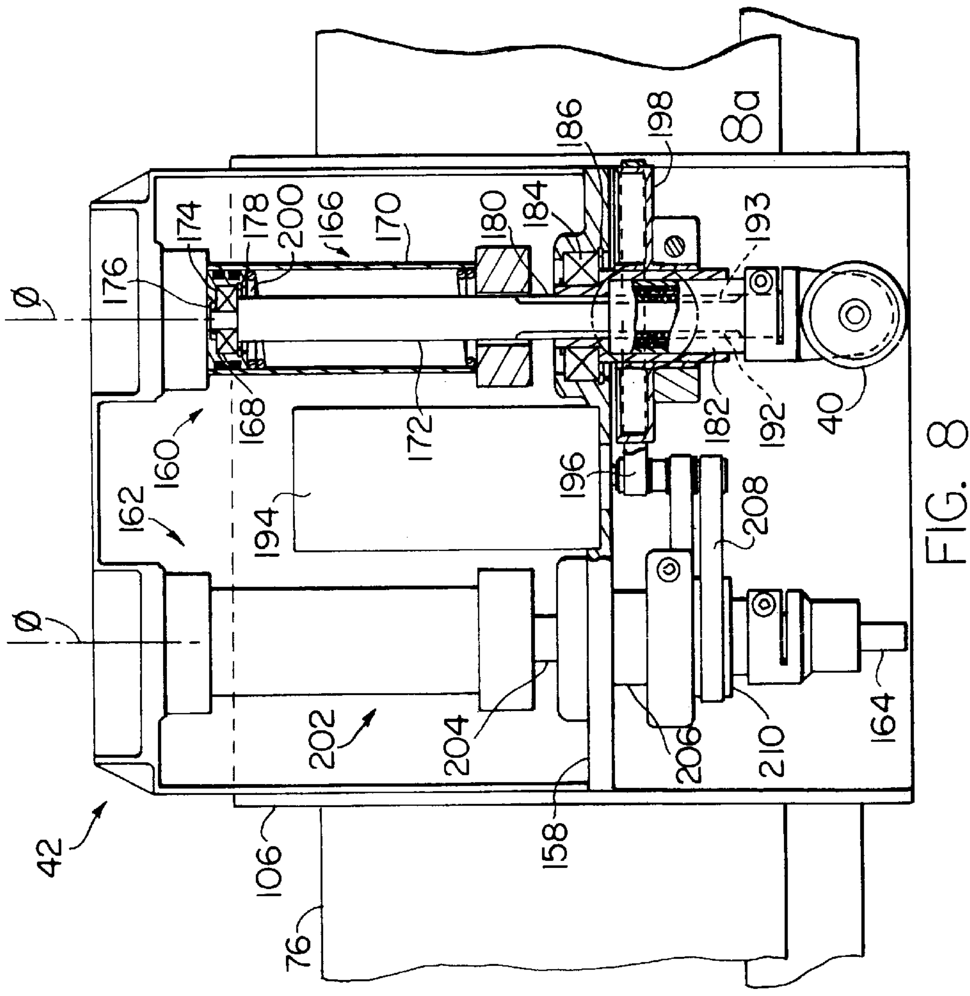
FIG. 8 is a fragmentary sectional view of the toolhead shown in FIG. 2.

Referring now to the toolhead 42 and referring in particular to FIG. 8, the toolhead comprises an integrally formed tool support or platform 158 directly attached to the carriage 106 and a plurality of tool assemblies mounted on the support. Two such assemblies are shown in FIG. 8; tool assembly 160 includes the cutting wheel 40 and assembly 162 includes a drill 164. It should be understood that the invention is not limited to a toolhead carrying only two tool assemblies or to the particular assemblies shown. On the contrary, the toolhead 42 may carry any number of different tool assemblies for performing multiple work operations on the fabric 36 or other sheet material supported on the support surface 34. For example, in the preferred embodiment of the invention, the toolhead 42 carries the illustrated cutting wheel and drill assemblies, and in addition carries a plotting pen assembly and a drag knife assembly. In cases where the sheet material is either very thick or tough, such as where a thick sheet of leather or hide is being cut, the toolhead 42 is also provided with a reciprocating knife assembly. Other tool assemblies commonly used for working on sheet materials could also be supported on the toolhead 42 such as, for example, an assembly including an ink jet printing head or an ultrasonic head.

All of the assemblies include the same components for moving their respective tools between the working and the non-working positions and for rotating the tool about the illustrated Ø axis to cause the tool to perform a work operation on the fabric 36 along any work path defined by the marker instructions. Accordingly, to avoid needless redundancy, these components will be described in connection with the tool assembly 160.

As illustrated in FIG. 8, the tool assembly 160 comprises pneumatic piston and cylinder assembly 166 including piston 168 and cylinder 170. An air supply (not shown) delivers compressed air to the cylinder to operate the piston according to command signal received from the controller 12, as will be explained further below. The assembly 160 further includes a spline shaft 172 journaled directly into the piston 168 by bearing 174 and secured therein by snap ring 176. The bearing 174 is itself secured in the piston by snap ring 178. The lower portion 180 of spline shaft 172 is slidably received within a circulating ball bearing or nut 182, and the cutting wheel 40 is secured to the lower end of the shaft.

The circulating ball bearing 182 is rotatably mounted on the tool support 158 by bearing 184, which is secured in the support 158 by snap ring 186. As shown best in FIG. 8*a*, the bearing 182 includes a plurality of balls 188 which circulate within generally oval-shaped passageways 190, 191 formed in the bearing and engage corresponding splines 192, 193 defined by the lower portion 180 of the spline shaft 172. Thus, the spline shaft 172 is not only slidably received within the bearing 182, but also is locked in rotatable engagement with the bearing.

A drive motor 194 is mounted on the tool support 158 and is drivingly connected to the circulating ball bearing 182 by a toothed drive belt 196 and a pulley 198 affixed to the bearing. As the drive motor rotates the pulley in response to command signals received from the controller 12, the circulating ball bearing rotates within the bearing 184 and the spline shaft, engaged by the ball bearing for rotation therewith, rotates within the piston 168. Thus, the cutting wheel 40 is controllably rotated about the Ø axis as required to cut the fabric 36 according to the marker instructions.

As will be appreciated from the above description and FIG. 8, rotation of the cutting wheel about the Ø axis is accomplished without rotation of the piston 168. Accordingly, by journaling the spline shaft 172 in the piston 168, the problems associated with attempting to seal a rotating piston within the cylinder 170 are eliminated. Further, since the mass of the piston 168 need not be rotated to properly position the cutting wheel 40 about the Ø axis, the size and power of the drive motor 194 can be reduced significantly.

It should also be appreciated that while the illustrated preferred embodiment utilizes the spline shaft 172 slideably received within the circulating ball bearing 182, the invention is not limited in this regard. For example, a contoured shaft slideably received within a similarly shaped friction bearing or bushing could also be employed. Thus, a shaft of star-shaped, square or oblong cross-section slidably received within the respectively contoured appeture of a friction bearing could be used in place of the illustrated spline shaft and circulating ball bearing.

As shown in FIG. 8, the cutting wheel 40 is normally biased upward in the non-working position by a spring 200. Just prior to the start of a cutting operation, and under the direction of the controller 12, compressed air is forced into the cylinder 170 to move the piston 168 downwardly and the cutting wheel 40 to the working position, wherein the wheel engages the fabric 36 and the work surface 58. When the cutting operation is complete, the supply of compressed air is discontinued, again under the direction of the controller 12, and the spring 200 returns the cutting wheel 40 to the non-working position. While the illustrated embodiment employing the spring 200 is preferred it is not, of course, required, and a double-acting piston could be utilized instead.

As noted above, all of the tool assemblies carried by the toolhead 42 operate in essentially the same manner as described above in connection with the cutting wheel assembly 160. Accordingly, the drill assembly 162 comprises piston and cylinder assembly 202, spline shaft 204, circulating ball bearing 206 and a drive belt 208 and pulley 210 connecting the bearing to the drive motor 194 to rotate the drill 164.

Thus, by providing a single drive motor and means for rotatably mounting a tool directly into a piston which moves the tool into and out of working engagement with the fabric 36 or other sheet material supported on the surface 34, a simple, light-weight toolhead capable of performing multiple work operations is provided. Such a design not only reduces the overall size of the toolhead 42, thus enhancing the low-profile appearance of the apparatus 14, but also reduces the weight carried by the carriage 106, thus reducing deflections in the beam 76 as the carriage and beam move together during a work operation.

Figure 9C:
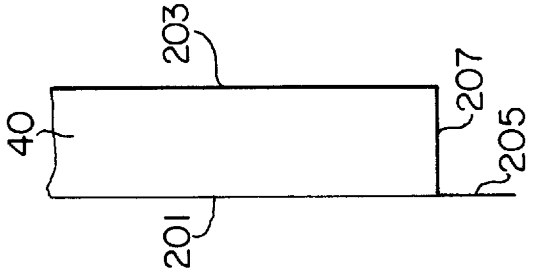
FIG. 9*c* is an enlarged fragmentary view of an alternative embodiment of the cutting wheel shown in FIG. 9*a*.
Figure 9B:
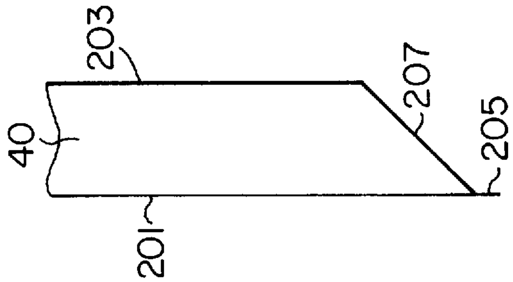
FIG. 9*b* is an enlarged, fragmentary view of a preferred embodiment of the cutting wheel shown in FIG. 9*a*.
Figure 9A:
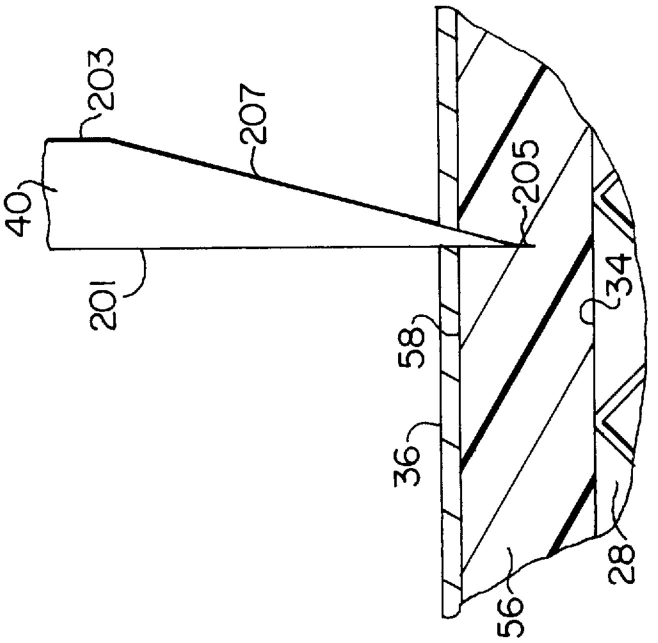
FIG. 9*a* is a enlarged fragmentary sectional view of the cutting wheel that forms a part of the toolhead shown in FIG. 2.

Referring now to the cutting wheel 40 in more detail and specifically to FIG. 9*a*, the wheel 40 has a substantially flat first surface 201 and a second surface 203 which defines a generally wedge-shaped integral cutting edge 205 and stop surface 207. It can be seen from FIG. 9*a*, that when the cutting wheel is in the working position and in cutting engagement with the fabric 36, the wheel cuts through the fabric and penetrates into the layer 56 of porous paper. As the cutting wheel 40 is moved downwardly into engagement with the fabric 36 and the layer 56 by the piston 168, contact between the stop surface 207 and the layer 56 inhibits penetration of the cutting wheel into this layer to properly limit the cutting depth of the wheel 40. The integral cutting edge 205 and stop surface 207 are disposed at an angle measured with respect to the first surface 201 of from about 15° to about 60°. Preferably, this angle is from about 15° to about 30°. In the illustrated embodiment of the invention, the cutting wheel 40 has a thickness of about 0.06 inches and a diameter of about 1.02 inches, although it should be understood that the invention is not limited to a cutting wheel having these dimensions.

In the past, cutting wheels of the type used to cut fabric and other limp sheet materials have been formed with a generally V-shaped cutting edge. When in cutting engagement with the fabric 36, such a cutting wheel will penetrate deeply into the layer 56 of porous paper, and in fact will penetrate all the way down to the support surface 34 formed by the core 28. This not only damages the core, but also dulls the cutting edge of the wheel. Further, deep penetration of the wheel into the layer 56 causes the wheel to deflect when the wheel is rotated about the Ø axis to cut a circle or other sharp curve or angle in the sheet material, thus considerably reducing the cutting precision of the apparatus 14.

Since, as noted above, contact between the wedge-shaped integral cutting edge 205 and stop surface 207 limits the depth to which the wheel 40 penetrates the layer 56, deflections in the wheel as it is directed along a curved cutting path are substantially reduced. Accordingly, the apparatus 14 cuts with significantly higher precision when provided with a cutting wheel such as that shown in FIG. 9*a*.

FIGS. 9*b* and 9*c* illustrate alternative embodiments of the cutting wheel 40. In both embodiments, the stop surface 207 is not integral with the cutting edge 205, but is instead a separate surface disposed inwardly from the cutting edge of the wheel. The stop surface 207 is disposed at an angle measured with respect to the first surface 201 of from about 15° to about 90° and preferably from about 15° to about 30°. In FIG. 9B the cutting wheel is illustrated wherein the stop surface 207 is disposed at an angle of about 30°, and in the embodiment illustrated in FIG. 9*c* the stop surface is disposed at an angle of 90° measured with respect to the first surface 201.

It should be understood that in the embodiments shown in FIGS. 9*b* and 9*c* the cutting edge and stop surface may be integrally formed with the second surface 203. It is preferred, however, that the stop surface 207 be provided as an appropriately contoured disk-shaped metal or plastic member attached to the second surface 203.

While preferred embodiments have been shown and described, various modifications and substitutions may be made without departing from the spirit and scope of the invention. Accordingly, it is to be understood that the present invention has been described by way of example and not by limitation.

We claim:

1. A table for supporting sheet material during a work operation, said table comprising:

an air-permeable core, said core defining a vacuum plenum having a sheet material support surface.

2. The table of claim 1 further comprising a vacuum source in fluid communication with the air-permeable core for applying vacuum at the support surface.

3. The table of claim 1 further comprising a layer of fluid-permeable material supported on the support surface and defining a work surface, said work surface being in fluid communication with the plenum.

4. The table of claim 1 further comprising a digitizer disposed beneath the core, said digitizer being in electromagnetic communication with the work surface through the plenum.

5. The table of claim 1 wherein the digitizer comprises a plurality of overlapping digitizer panels.

6. The table of claim 1 wherein the core comprises an overexpanded plastic, said overexpanded plastic defining a plurality of interconnected vertical and horizontal air passageways.

7. A table for supporting sheet material during a work operation, said table comprising:

an air-permeable, rigid core, said core defining a vacuum plenum having a sheet material support surface and an opposite surface;

a layer of fluid-permeable material supported on the support surface, said material defining a work surface;

a vacuum source in fluid communication with the porous core and the fluid-permeable material for applying vacuum at the work surface; and a digitizer disposed adjacent to the opposite surface, said digitizer being in electromagnetic communication with the work surface through the plenum.

8. The table of claim 7 wherein the digitizer comprises a plurality of overlapping digitizer panels.

9. The table of claim 7 wherein the core comprises an overexpanded plastic, said overexpanded plastic defining a plurality of interconnected vertical and horizontal air passageways.

10. The table of claim 7 wherein the layer of fluid-permeable material comprises a layer of air-permeable paper.

11. An apparatus for performing a work operation on sheet material, said apparatus comprising:

a work table defining a work surface for supporting the sheet material during a work operation;

a beam mounted on the table and extending across the work surface, the beam and the work surface being moveable relative to one another in first coordinate direction;

a carriage carrying a tool for performing a work operation on the sheet material and being mounted for movement along the beam in a second coordinate direction, said carriage having a rigid, box-shaped structure defined by a plurality of thin, partially open, light weight walls extending circumferentially about an associated portion of the beam and;

a rigid, structural box disposed at one and the other ends of the beam for supporting the beam on the table, each to the rigid boxes being defined by a plurality of thin, light weight walls, said walls including a plurality of integrally formed reinforcing ribs to provide the box with structural rigidity and a plurality of integrally formed bosses for attaching the box to the beam, wherein the rigid boxes reduce deflection of the beam caused by movement of the beam in the first coordinate direction and deflection of the beam caused by movement of the carriage along the beam in the second coordinate direction.

12. The apparatus of claim 11 wherein the beam is mounted on the table for movement over the work surface in the first coordinate direction, and wherein the rigid boxes also reduce deflection of the beam caused by movement of the beam in the first coordinate direction.

13. The apparatus of claim 12 further comprising first drive means for moving the beam over the work surface in the first coordinate direction, said first drive means being substantially housed within at least one of the structural boxes.

14. The apparatus of claim 13, further comprising second drive means for moving the carriage along the beam in the second coordinate direction, said second drive means being housed within one of the structural boxes, wherein the second drive means comprises a drive motor drivingly connected to a spindle, said spindle having a belt drivingly connected to the carriage.

15. The apparatus of claim 13, wherein the first drive means comprises means drivingly connected to the table at the one and the other ends of the beam.

16. The apparatus of claim 15, wherein the first drive means comprises first and second motors which, respectively, drivingly engage the one and other ends of the beam with the table.

17. The apparatus of claim 16, wherein the first drive means further comprises means for drivingly connecting each of the first and second motors to an associated first and second pinion gear, each of the pinion gears being respectively engagable with first and second racks disposed along opposite sides of the table.

18. The apparatus of claim 17, wherein portions of the first and second drive motors, and the means for drivingly connecting the motors to the associated pinion gears are substantially housed within the structural boxes.

19. The apparatus of claim 17 further comprising means for adjusting the position of the first and second pinion gears with respect to the first and second racks.

20. The apparatus of claim 19, wherein the first and second pinion gears are respectively mounted on first and second shafts drivingly connected to the first and second drive motors, and wherein the means for adjusting the position of the pinion gears comprises means for adjustably mounting the first and second shafts on a respective one of the rigid boxes.

21. The apparatus of claim 20, wherein the means for adjustably mounting comprises first and second eccentric bushings rotatably supported on a respective one of the rigid boxes for rotatably receiving a respective one of the first and second shafts.

22. A support assembly for supporting a tool for movement relative to a work surface during a work operation, said assembly comprising:

a axially elongated beam extending across the work surface; and a tool carriage supported by the beam and mounted for movement along the beam, said tool carriage arranged in axially surrounding relation to an associated portion of the beam.

23. The support assembly of claim 22, wherein the tool carriage comprises means for slidably engaging the beam for movement thereon.

24. The support assembly of claim 22, wherein the tool carriage comprises a rigid, generally box-shaped structure surrounding the beam.

25. The support assembly of claim 23, wherein the beam defines an axially extending hollow portion and said apparatus further comprises:

drive means partially contained with the hollow portion for moving the carriage along the beam; and coupling means supported on the carriage for coupling the carriage to the drive means.

26. A toolhead assembly comprising:

a tool support for supporting a tool relative to a work surface;

a piston-cylinder assembly for moving the tool into and out of working engagement with the work surface;

means for rotatably mounting the tool on the piston; and drive means for slidably receiving the means for mounting and for rotating the means for mounting and the tool relative to the work surface.

27. The toolhead assembly of claim 26, wherein the means for rotatably mounting the tool on the piston comprises a shaft journaled into the piston, said shaft having a spline formed along at least a portion of its length.

28. The toolhead assembly of claim 27, wherein the drive means comprises:

a collar surrounding at least a segment of the splined portion of the shaft and having a corresponding passageway formed therein; and means for engaging the spline and the passageway.

29. The toolhead assembly of claim 28 further comprising a motor drivingly connected to the collar.

30. The toolhead assembly of claim 28 wherein the collar and the means for engaging comprises a circulating ball bearing.

31. The toolhead assembly of claim 26, wherein the piston/cylinder assembly is pneumatically actuated.

32. The toolhead assembly of claim 31, wherein the piston is spring biased to normally position the tool in non-working engagement with the surface.

33. A sample garment making system comprising:

a controller for creating a marker based on data representing individual pattern pieces defining corresponding parts of the sample garment, and data representing selected portions of the sheet material on which the pattern pieces are to be arranged and the corresponding garment parts are to be cut; and an apparatus controlled by command signals received from the controller for performing at least one work operation on the sheet material including:

a table comprising:

a porous, air-permeable core, said core defining a vacuum plenum, the plenum having a sheet material support surface for supporting the sheet material during a work operation and an opposite surface;

a digitizer disposed adjacent to the opposite surface, the digitizer being in electromagnetic communication with the support surface through the plenum and in communication with the central processor to provide the processor with data defining the sheet material;

a beam mounted on the table and extending across the support surface, each end of the beam being supported on the table by a rigid, structural box, the beam and the support surface being moveable relative to one another in a first coordinate direction;

a carriage axially surrounding an associated portion of the beam and mounted for movement along the beam in a second coordinate direction, wherein the rigid boxes and the carriage reduce at least the deflection of the beam caused by movement of the carriage along the beam in the second coordinate direction;

a toolhead carried by the carriage including:

at least one tool support for supporting a tool relative to the support surface;

a piston-cylinder assembly for moving the tool into and out of working engagement with the support surface;

means for rotatably mounting the tool on the piston; and drive means for slidably receiving the means for mounting and for rotating said means and the tool relative to the support surface.

34. A cutting wheel comprising a first substantially flat first side surface and a second side surface defining a cutting edge, said second side surface further defining a stop surface for limiting the cutting depth of the wheel.

35. The cutting wheel of claim 34, wherein the stop surface is disposed inwardly from the cutting edge and extends outwardly from the cutting edge at an angle of from about 15° to about 90° measured with respect to the first surface.

36. The cutting wheel of claim 34 wherein the stop surface extends rearwardly and outwardly from the cutting edge at an angle of from about 15° to about 60° measured with respect to the first surface.

37. The cutting wheel of claim 34 wherein the stop surface is integral with the second surface.

* * * * *